(12) United States Patent
Zhao et al.

(10) Patent No.: US 11,029,802 B2
(45) Date of Patent: Jun. 8, 2021

(54) AUTOMATED COMMAND-LINE INTERFACE

(71) Applicant: INTERNATIONAL BUSINESS MACHINES CORPORATION, Armonk, NY (US)

(72) Inventors: Su Ning Zhao, Shanghai (CN); ChunLei Shang, ShenZhen (CN); Anqi Lu, Shanghai (CN); Haoran Hu, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 15/905,875

(22) Filed: Feb. 27, 2018

(65) Prior Publication Data
US 2019/0265843 A1 Aug. 29, 2019

(51) Int. Cl.
*G06F 3/0481* (2013.01)
*G06F 3/0489* (2013.01)
*G06F 3/0484* (2013.01)
*G06F 9/451* (2018.01)

(52) U.S. Cl.
CPC .......... *G06F 3/0481* (2013.01); *G06F 3/0489* (2013.01); *G06F 3/04845* (2013.01); *G06F 9/451* (2018.02)

(58) Field of Classification Search
CPC ... G06F 3/0481; G06F 3/04845; G06F 3/0489
See application file for complete search history.

(56) References Cited

U.S. PATENT DOCUMENTS

| 5,404,440 A | * | 4/1995 | Asahi | G06F 3/0481 |
| | | | | 715/746 |
| 5,502,803 A | * | 3/1996 | Yoshida | G06F 3/04883 |
| | | | | 715/201 |
| 5,602,750 A | * | 2/1997 | Severt | G01R 15/12 |
| | | | | 324/555 |

(Continued)

OTHER PUBLICATIONS

Wikipedia, "Text-based user interface", https://en.wikipedia.org/wiki/Text-based_user_interface, printed Jun. 15, 2017, pp. 1-5.

(Continued)

*Primary Examiner* — Jung-Mu T Chuang
(74) *Attorney, Agent, or Firm* — Ewa M. Wozniak

(57) ABSTRACT

Efficiently executing command-line interface commands with an automated command-line interface. A computing device presents a command-line interface for entry of a command-line by a user. The computing device receives a command-line in the command-line interface to execute an editable view container, the editable view container displaying target content in an editable viewer. The computing device receives one or more user edits to modify the target content entered by the user into the editable viewer. The one or more user edits to the target content are validated. The computing device accesses a manifest file containing a plurality of stored command-lines, each stored command-line corresponding to possible user edits. The computing device executes automatically stored command-lines corresponding to the one or more user edits to modify the target content. The modified target content is displayed in the editable viewer.

15 Claims, 6 Drawing Sheets

(56) References Cited

U.S. PATENT DOCUMENTS

| | | | | |
|---|---|---|---|---|
| 5,623,591 A * | 4/1997 | Cseri | G06F 40/117 | 715/762 |
| 5,832,266 A * | 11/1998 | Crow | G06F 3/033 | 719/316 |
| 6,690,392 B1 * | 2/2004 | Wugoski | H03J 1/0025 | 715/744 |
| 6,724,408 B1 * | 4/2004 | Chen | G06F 9/45512 | 715/853 |
| 7,039,724 B1 * | 5/2006 | Lavian | H04L 41/0213 | 707/999.001 |
| 7,113,989 B2 * | 9/2006 | Murray | H04L 41/022 | 370/241 |
| 7,290,263 B1 * | 10/2007 | Yip | G06F 8/38 | 717/121 |
| 7,360,247 B2 * | 4/2008 | Girard | G07F 7/082 | 713/176 |
| 7,421,658 B1 * | 9/2008 | Sharma | G06F 9/45512 | 715/733 |
| 7,707,275 B2 * | 4/2010 | Joshi | G06F 8/427 | 709/220 |
| 7,810,041 B2 * | 10/2010 | Rao | H04L 41/0806 | 715/771 |
| 7,913,164 B1 * | 3/2011 | Svendsen | H04N 1/00132 | 715/249 |
| 8,090,838 B2 * | 1/2012 | McCollum | G06F 9/45512 | 709/227 |
| 8,165,567 B2 * | 4/2012 | Kim | H04M 1/72544 | 348/14.01 |
| 8,229,871 B2 * | 7/2012 | Woolf | G06F 30/00 | 706/45 |
| 8,838,858 B1 * | 9/2014 | Wu | G06F 5/00 | 710/65 |
| 8,954,869 B2 * | 2/2015 | Courteaux | G06F 8/38 | 715/708 |
| 9,003,295 B2 * | 4/2015 | Baschy | G06F 21/62 | 715/741 |
| 9,674,249 B1 * | 6/2017 | Kekre | H04L 65/60 | |
| 9,690,770 B2 * | 6/2017 | Desai | G06F 17/2705 | |
| 9,812,170 B2 * | 11/2017 | Benson | G11B 27/034 | |
| 10,037,429 B1 * | 7/2018 | Rodriguez Bravo | G06F 21/602 | |
| 10,303,888 B2 * | 5/2019 | Rodriguez Bravo | G06F 21/10 | |
| 10,318,013 B1 * | 6/2019 | Banks | G06F 3/03 | |
| 2004/0088555 A1 * | 5/2004 | Girard | G07F 7/082 | 713/192 |
| 2004/0163090 A1 * | 8/2004 | Ledru | G06F 9/45512 | 719/320 |
| 2004/0239700 A1 * | 12/2004 | Baschy | G06F 21/62 | 715/781 |
| 2004/0249849 A1 * | 12/2004 | Mordkovich | G06F 8/38 | |
| 2005/0021987 A1 * | 1/2005 | Cahill | G06F 21/10 | 713/193 |
| 2006/0242403 A1 * | 10/2006 | Joshi | G06F 8/427 | 713/150 |
| 2007/0150299 A1 * | 6/2007 | Flory | H04L 63/20 | 705/51 |
| 2007/0192773 A1 * | 8/2007 | McCollum | G06F 9/45512 | 719/330 |
| 2007/0234228 A1 * | 10/2007 | Rao | H04L 41/0806 | 715/771 |
| 2009/0100529 A1 * | 4/2009 | Livnat | G06F 21/6209 | 726/28 |
| 2009/0158153 A1 * | 6/2009 | Courteaux | G06F 3/0484 | 715/708 |
| 2009/0199187 A1 * | 8/2009 | Cervantes | G06F 9/4843 | 718/101 |
| 2009/0217163 A1 * | 8/2009 | Jaroker | G06F 8/60 | 715/700 |
| 2010/0017720 A1 * | 1/2010 | Anderson | G06F 16/34 | 715/738 |
| 2010/0180322 A1 * | 7/2010 | Finn | H04L 12/4625 | 726/4 |
| 2011/0040812 A1 * | 2/2011 | Phillips | G06F 9/45541 | 707/822 |
| 2011/0161054 A1 * | 6/2011 | Woolf | G06F 17/00 | 703/1 |
| 2011/0289601 A1 * | 11/2011 | Bellwood | G06F 21/10 | 726/30 |
| 2012/0117132 A1 * | 5/2012 | Iizuka | G06F 9/445 | 707/827 |
| 2012/0192096 A1 | 7/2012 | Bowman et al. | | |
| 2012/0206566 A1 * | 8/2012 | Fedoseyeva | G06Q 10/06398 | 348/38 |
| 2012/0311426 A1 * | 12/2012 | Desai | G06F 17/2705 | 715/227 |
| 2013/0013268 A1 * | 1/2013 | Woolf | G06F 17/00 | 703/1 |
| 2013/0298059 A1 * | 11/2013 | Raskin | G06F 3/0484 | 715/767 |
| 2014/0250326 A1 * | 9/2014 | Ferguson | G06F 11/1471 | 714/20 |
| 2014/0372896 A1 * | 12/2014 | Raman | G06F 3/0488 | 715/741 |
| 2015/0019199 A1 * | 1/2015 | Andrews | G06F 9/45508 | 703/26 |
| 2015/0082166 A1 * | 3/2015 | Sarbin | G06F 3/0488 | 715/708 |
| 2016/0350521 A1 * | 12/2016 | Brandt | G05B 19/4155 | |
| 2017/0357631 A1 * | 12/2017 | Desai | G06F 17/2705 | |
| 2018/0322294 A1 * | 11/2018 | Rodriguez Bravo | G06F 21/6209 | |
| 2020/0064929 A1 | 2/2020 | Fan et al. | | |

OTHER PUBLICATIONS

Wikipedia, "Curses (programming library)", https://en.wikipedia.org/wiki/Curses_(programming_library), printed Jun. 15, 2017, pp. 1-4.

Hightek.org., "Technology, science, and open source projects", "http://hightek.org/projects/dialog/screenshots", printed Jun. 15, 2017, pp. 1-3.

Wikipedia, "Ncurses", https://en.wikipedia.org/wiki/Ncurses, printed Jun. 15, 2017, pp. 1-4.

Wikipedia, "Newt (programming library)", https://en.wikipedia.org/wiki/Newt_(programming_library), printed Jun. 15, 2017, pp. 1-3.

http://www.vim.org, "Vim—the ubiquitous text editor", printed Jun. 15, 2017, p. 1.

Unknown, "Catagory:Applications:Editor", en.opensource.org, 2011 Novell, Inc. p. 1.

Cisco, IOS Configuration Fundamentals Command Reference, Cisco.com, Release 12.2, "Chapter: Basic Command-Line Interface Commands", Feb. 12, 2014, pp. 1-22.

Vossen, "Automate security with GUI shell and command line scripts", TechTarget, Search security, May 30, 2001, pp. 1-10.

Mell et al., "The NIST Definition of Cloud Computing", National Institute of Standards and Technology, Special Publication 800-145, Sep. 2011, pp. 1-7.

* cited by examiner

AUTOMATED COMMAND-LINE INTERFACE

BACKGROUND

The present invention relates generally to the field of command-line interfaces, and, more particularly, to automated command-line interfaces.

BRIEF SUMMARY

Embodiments of the present invention disclose a method, system, and computer program product for efficiently executing command-line interface commands with an automated command-line interface. A computing device presents a command-line interface for entry of a command-line by a user. A computing device receives a command-line in the command-line interface to execute an editable view container, the editable view container displaying target content in an editable viewer. The computing device receives one or more user edits to modify the target content entered by the user into the editable viewer. The one or more user edits are validated. The computing device accesses a manifest file containing a plurality of stored command-lines, each stored command-line corresponding to possible user edits. The computing device executes automatically the stored command-lines corresponding to the one or more user edits to modify the target content. The modified target content is displayed in the editable viewer.

DETAILED DESCRIPTION

Command-line interfaces have evolved from their initial use in the mid-twentieth century as the primary means of interacting with a computer to perform various functions, to their current deployment as merely one alternative of several means of computer access, with the primary means of access being a graphic-user interface or the like. At present, advanced computer users still frequently prefer command-line interfaces as they offer a precise, efficient, fast, and convenient manner of performing operations with the computer such as controlling programs, accessing network connections, utilizing operating systems, etc. in the course of accessing target content available on the computer. The drawback, however, of command-line interfaces is that in order to perform complex operations, a large amount of typing on a keyboard may need to be performed. Typing large amounts of text commands is potentially time consuming (particularly if a large amount of text must be retyped several times), and demands a large amount of memorization on behalf of the user to remember all of the text commands utilized. With large amounts of manually entered text, the potential for manual typing errors introduced by a human user also increases. A need, therefore, exists for an efficient manner of entering of text commands into a command-line interface. Presented is a method, system, and computer program product for efficiently executing command-line interface commands with an automated command-line interface.

Figure 1:
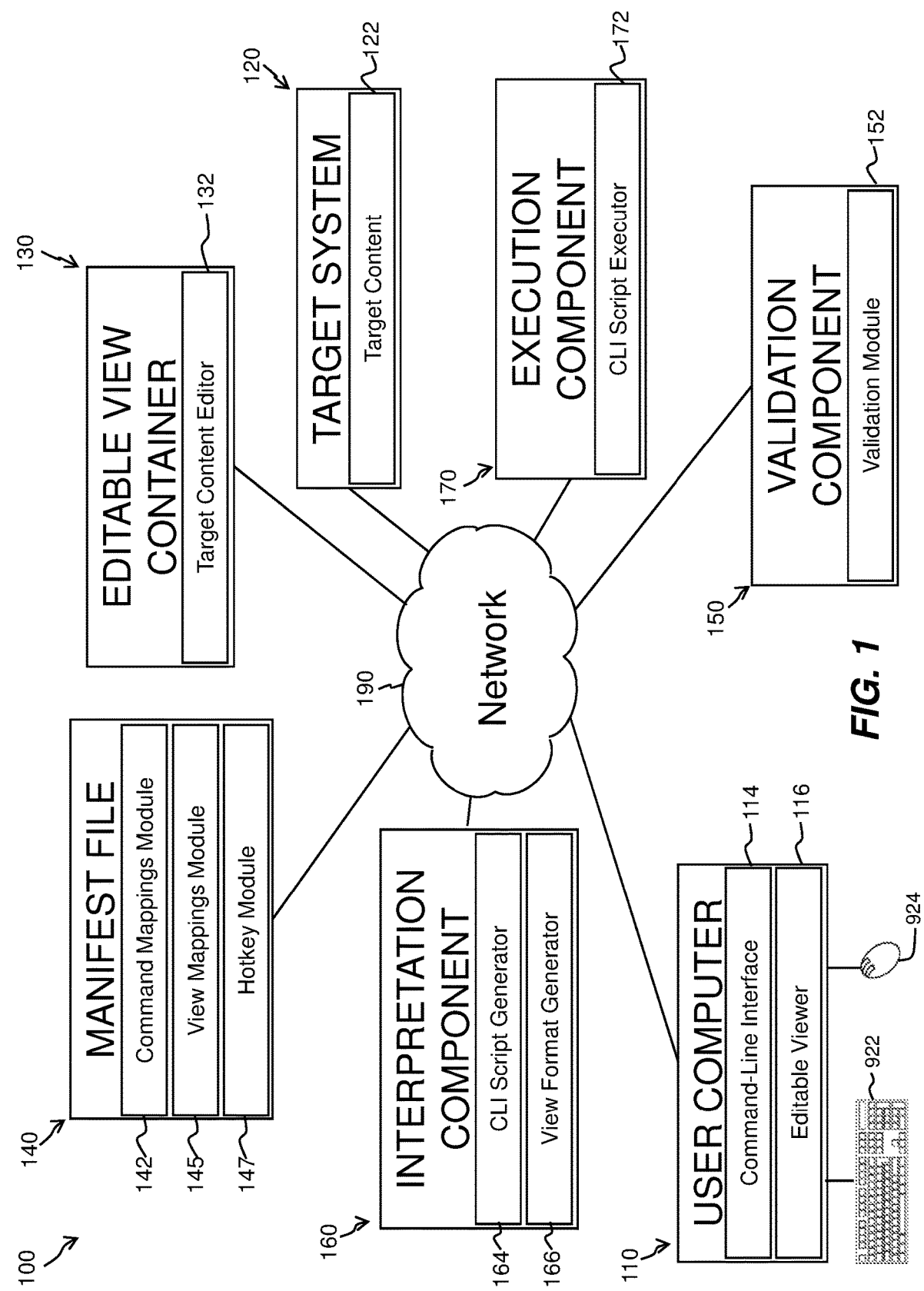
FIG. 1 is a functional block diagram illustrating an environment for efficiently executing command-line interface commands with an automated command-line interface, in accordance with an embodiment of the present invention.

FIG. 1 is a functional block diagram illustrating an environment 100 for efficiently executing command-line interface commands with an automated command-line interface, in accordance with an embodiment of the present invention. A user at user computer 110 seeks to access target content 122 (such as, by means of non-limiting example, computer data, computer resources, computer services, etc. stored, residing, or executing at least in-part on target system 120, including tuples of a database, a list of various network connections, a directory of computer files, data regarding utilization of computer memory resources, or any other computerized content). As displayed in connection with FIG. 4, a keyboard 922, a pointing device 924, or other interface device provide physical means for user to access the command-line of the user computer 110.

As discussed more extensively below, a command-line interface 114 available on the user computer 110 allows the user to issue typewritten command-lines (typed, such as by the keyboard 922) to view, edit, execute, or otherwise access or modify target content 122 available on the target system 120 without the use of a graphic-user interface or another, less efficient means. Alternatively, a soft-keyboard in combination with a pointing device 924 (such as a mouse) may be utilized, a microphone and speech-to-text software, or another means to issue typewritten commands to the command-line interface. Complex typewritten command-lines, while efficient, may require a large amount of typing on behalf of the user, which presents the issue of introducing errors.

The present invention offers an efficient, alternate means to view, edit, modify, execute, and/or perform other operations with regard to target content 122 on the editable view container 130, to reduce the likelihood of introducing errors when typing a large number of complex commands, as well as reduce the amount of typing required by the user. In an embodiment of the invention, if the user at user computer 110 desires to open the editable view container 130 to access the target content 122, in accordance with an embodiment of the invention, a short typewritten command is entered into the command-line interface 114 to cause the editable view container 130 to open (or, alternately, the editable view container 130 is opened by clicking a link with a mouse 924, opening an application, typing an address into a web browser, or the equivalent, causing the editable view container 130 to open). The editable view container 130 displays the target content 122 in a tabular fashion on the user computer 110 (such as by a list having columns and rows), or by graphical means, for viewing by the user, and allows the user at user computer 110 to view, edit, modify, perform other operations, and/or execute the target content without only typing commands in the command-line interface 114 by, for example, moving a cursor and typing directly over the target content displayed in tabular fashion on the editable view container 130 with keyboard 922, utilizing keyboard shortcuts to perform various functions, copying-and-pasting with pointing device 924, clicking-and-dragging, or editing or modifying the target content in another manner (collectively, performing "user edits"), while minimizing the typing of commands in the command-line interface 114. The view provided by the editable view container 130 replaces the view provided by the command-line interface in the user computer 110 (however, in alternate embodiments, exists side-by-side with the command-line interface in the user computer 110, allowing user edits in conjunction with commands entered into the command-line interface 114).

As is further discussed below, the various keyboard shortcuts, various command mappings (mapping user edits received from the user computer 110 with one or more command-line interface commands, to perform the user edits requested), view mappings (allowing the user to automatically change the view of the target content 122), and other data are stored in a manifest file 140. In various embodiments of the invention, the manifest file 140 contains a mapping of the various keyboard shortcuts, command mappings, and/or view mappings to one or a series of command-line interface commands that are executed automatically. In an embodiment of the invention, the manifest file 140 is a computer file which may be edited automatically, by user at user computer 110, another user, etc.

When the user at user computer 110 has completed all the editing, modifying, performing of other operations, etc. of the target content 122 in the editable view container 130, the user may issue a "save command," a "validate command," an "execute command," or the equivalent to automatically enter edits to the target content into the target system 120. Such a command may be performed with a hotkey combination, clicking-and-dragging with pointing device 924, etc. Alternately, a timer runs out or another means of indicating all editing has been performed is utilized. When this occurs, all edits, modifications, of other operations, etc. are validated by the validation module 150.

The validation module 150 serves to determine whether all of user edits requested by the user may be performed to the target content 122. The validation module 150 may, by means of non-limiting example, determine whether all of the fields modified by user are of correct length, whether any of the user edits are to "protected content" or "protected area," which may not be changed, whether a data type change is valid, whether a user edit fits into available memory space, etc. If some or all of the user edits fail validation by the validation module 150, the editable view container 130 may present a window to user at user computer 110 informing of which user edits failed, the reason for the failure, and/or provide a suggestion for correction, in accordance with various embodiments of the invention.

If all user edits are accepted by the validation module 150, interpretation component 160 serves to interpret all of the user edits into command-line interface commands, which are scheduled in an order established by the validation module 150 to perform the function desired by user.

The execution module 170 executes automatically all the user edits interpreted by the interpretation component 160 into command-line interface commands in the command-line interface 114 of user computer 110.

In various embodiments, each of user computer 110, target system 120, editable view container 130, manifest file 140, validation component 150, interpretation component 160, and execution component 170 may include internal and external hardware components as depicted and described in further detail below with reference to FIG. 4, below. In the exemplary embodiment, each of user computer 110, target system 120, editable view container 130, manifest file 140, validation component 150, interpretation component 160, and execution component 170 are implemented in a cloud computing environment, as described in relation to FIGS. 5 and 6 below.

User computer 110, target system 120, editable view container 130, manifest file 140, validation component 150, interpretation component 160, and execution component 170, in effect, represent any sort of computing device possessing sufficient computing power to execute software to be utilized in efficiently executing command-line interface commands with an automated command-line interface, in accordance with an embodiment of the invention. Computing devices associated with user computer 110, target system 120, editable view container 130, manifest file 140, validation component 150, interpretation component 160, and execution component 170 may utilize a hosted workload as displayed in connection with FIG. 5, bellow, and/or perform other tasks as further described herein.

In various embodiments, all of user computer 110, target system 120, editable view container 130, manifest file 140, validation component 150, interpretation component 160, and execution component 170 are connected via network 190. Network 190 represents, for example, an internet, a local area network (LAN), a wide area network (WAN) such as the Internet, and includes wired, wireless, or fiber optic connections. In an alternate embodiment, network 190 may represent connections, and/or buses, within one computer. In general, network 190 may be any combination of connections and protocols that will support communication between each of user computer 110, target system 120, editable view container 130, manifest file 140, validation component 150, interpretation component 160, and execution component 170.

In the exemplary embodiment, user computer 110 includes a command-line interface 114 and an editable viewer 116.

Command-line interface 114 represents software for a user at user computer 110 to type and enter command-line interface commands with keyboard 922 (or in another manner) to perform various functions in connection with the user computer 110. In connection with the presently disclosed invention, the user may utilize the command-line interface 114 to view, edit, execute, or otherwise access or modify target content 122 available on the target system 120 without the use of a graphic-user interface or another means. Target content 122 may be, by means of non-limiting example, tuples of a database, a list of various network connections, a directory of computer files, data regarding utilization of computer memory resources, or any other computerized content, as further discussed herein. The command-line interface 114 presents a simple text prompt into which user types and enters commands to view, edit, execute, or otherwise access or modify target content available on the target system 120. In an embodiment of the invention, if the user at user computer 110 desires to open the editable view container 130 to view, edit, execute, or otherwise access or modify target content 122, a short typewritten command is entered into the command-line interface to cause the editable view container 130 to open the editable view container, and also open the editable viewer 116 on the user computer 110. In a further embodiment of the invention, the view provided by the editable view container 130 (via the editable viewer 116) replaces the view provided by the command-line interface 114, but in alternate embodiments of the invention, the command-line interface 114 and the editable viewer 116 are displayed side-by-side in the user computer 110.

Editable viewer 116 represents software for a user at user computer 110 to operate in conjunction with the editable view container 130 to provide the user target content 122 to view, edit, execute, or otherwise modify or access by the user, in connection with the presently disclosed invention. As discussed previously, in various embodiments, the editable viewer 116 is started by a short typewritten command entered into the command-line interface 114, clicking a link with pointing device 924, opening an application, typing an address into a web browser, or another manner, in various embodiments of the invention, etc. The editable viewer 116, in conjunction with the editable view container 130, displays the target content 122 in a tabular fashion (such as by a list having columns and rows) for viewing by the user. The user at user computer 110 is thus able to view, edit, execute, modify, etc. the target content 122 without only typing commands in the command-line interface by, for example, moving a cursor with pointing device 924, clicking-and-dragging target content, and/or editing or modifying in another manner, while minimizing the typing of commands in the command-line interface 114.

In the exemplary embodiment, target system 120 includes target content 122.

Target content 122 represents computerized data, resources, services, stored, residing, or executing at least in-part on target system 120, which is to be viewed, edited, executed, or otherwise accessed by user at user computer 110. Target content may be, by means of non-limiting example, tuples of a database, a list of various network connections, a directory of computer files, data regarding utilization of computer memory resources, or any other computerized content (as further discussed herein). As discussed above, the target content 122 is provided to the user via the editable viewer 116 and the editable view container 130. The target content 122 is also available for viewing, editing, etc. by the command-line interface 114 to issue typewritten command-lines (typed, such as by the keyboard 922) to view, edit, execute, or otherwise access or modify target content available on the target system 120 without the use of a graphic-user interface or another means.

In the exemplary embodiment, editable view container 130 includes target content editor 132.

Target content editor 132 represents software and/or hardware for transmitting target content from the target system 120 to the user computer 110 for viewing, editing, accessing, or execution, as further discussed herein. The target content 122 is accessible by the user at user computer 110 via the editable viewer 116. Target content editor 132 also receives edits and executes commands from the editable viewer 116 of user computer 110 with regard to the target content 122.

In the exemplary embodiment, manifest file 140 includes command mappings module 142, view mappings module 145, and hotkey module 147.

Command mappings module 142 represents hardware and/or software for storage and execution of command mappings for utilization by user computer 110. Command mappings stored in the command mappings module 142 map user edits received from the user computer 110 with one or more command-line interface commands to perform the viewing, editing, execution, or otherwise access or modify target content available on the target system 120, in accordance with the user edits. A user, when utilizing the editable viewer 116 to view, edit, execute, or otherwise access or modify target content, may, execute operations in the editable viewer 116 with a keyboard 922, such as moving a cursor over certain data, typing over it with keyboard 922, copying-and-pasting with a keyboard 922 or pointer device 924 commands, etc., in performing various user edits When user enters the "save command," a "validate command," an "execute command," or the equivalent to enter edits to the target content into the target system 120, the target content editor 122 receives the command, and utilizes the command mappings module 142 to determine a series of command-line interface commands to perform the command or commands requested by the user.

View mapping module 145 represents software and/or hardware for storage and execution of view mappings for automatically changing the view of target content 122 displayed in the editable viewer 116. Target content 122 is viewed by the user at user computer 110 in various formats, in different embodiments of the invention, including in a tabular format. View mappings stored in the view mapping module 145 allow for automatically changing the view of target content displayed in the editable viewer 116. If the user at user computer 110 desires to change the viewing format of the target content 122, the user may use, in various embodiments of the invention, a hotkey combination, clicking-and-dragging with pointing device 924, etc. to select a preferred view of target content 122. When the user changes the selected view of target content 122, view mapping module 145 may, in an embodiment of the invention, be selected to execute one or a series of command-line interface commands stored in the view mapping module 145 to generate the view (or, in alternate embodiments, generate the view request by the user in another manner.).

Hotkey module 147 represents hardware and/or software for storing a plurality of hotkey combinations for fast and easy performance by the user of various functionality in the presently-disclosed invention. Hotkey module 147 indicates a mapping between each hotkey combination and one or more command-line interface commands to perform the functionality. Execution of a hotkey combination by user at user computer 110 allows the user to quickly and easily perform functionality in connection with target content 122, including changing the view (with the aid of view mappings module 145) or performing various editing, modification, execution, and/or otherwise access or modify the target content 122 (with the aid of the command mappings module 142).

In the exemplary embodiment, validation component 150 includes validation module 152.

Validation module 152 represents hardware and/or software for confirming that all of user edits to the target content may be legally performed to the target content 122, for various reasons. The validation module 152 may, for example, determine whether all of the fields of target content 122 modified by the user are of correct length, whether any of the user edits are to "protected content" or "protected area," which may not be changed, etc. If some or all of the user edits fail validation by the validation module 150, the validation module 150 may indicate so, and the editable view container 130 via the editable viewer 116 may present a window to user at user computer 110 indicating which user edits failed.

In an embodiment of the invention, the validation module 152 may also determine an order of execute of command-line interface commands.

In the exemplary embodiment, interpretation component 160 includes CLI script generator 164 and view format generator 166.

CLI script generator 164 represents hardware and/or software for interpretation and generation of a script of command-line interface commands for viewing, editing, executing, or otherwise accessing or modifying target content, in performing the command or commands requested by the user. CLI script generator 164 retrieves command-line interface commands to generate a script to perform the user edits requested by the user from the command mappings module 142, view mappings module 145, and/or the hotkey module 147, and (if they are validated by the validation module 152), for automatic execution by the execution component 170, by execution of the generated script.

View format generator 166 represents hardware and/or software for formatting a view for the user to review the target content 122. View format generator 166 utilizes stored command-line interface commands stored in the view mappings module 145 to format and generate a script to generate the view requested by the user to review the target content (if the view is validated by the validation module 151). In an embodiment of the invention, the script may be automatically executed by the execution component 170.

In an exemplary embodiment, execution component 170 includes CLI script executor 172.

CLI script executor 172 represents hardware and/or software for execution of a script of command-line interface commands generated by the CLI script generator 164 (or another portion of the presently disclosed invention) or the view format generator 166. The output of the CLI script executor 172 may be presented in the command-line interface 114, or the editable viewer 116, or both, in various embodiments of the invention.

Figure 2A:
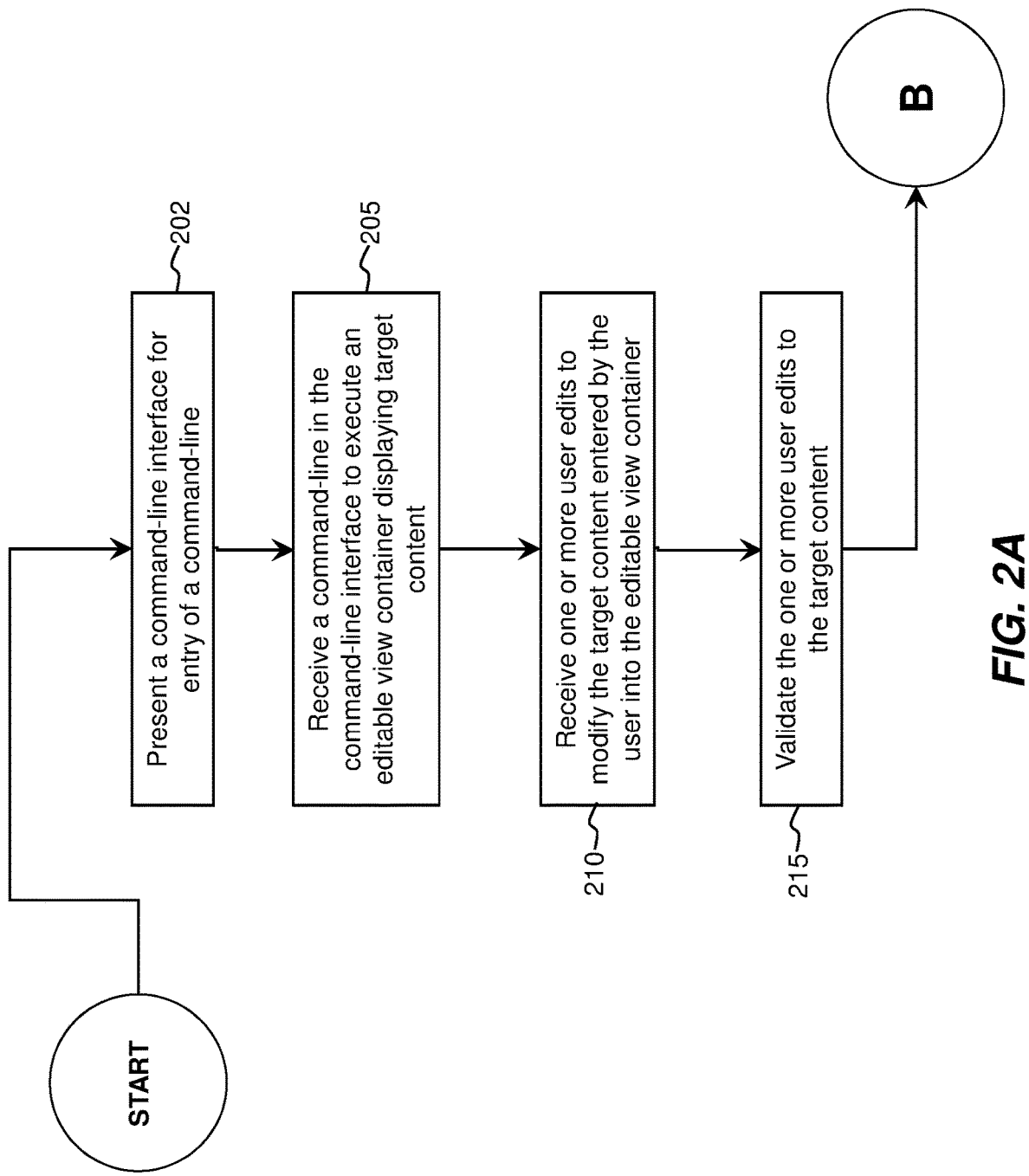
FIGS. 2A and 2B are a flowchart depicting operational steps that a hardware component of a hardware appliance may execute, in accordance with an embodiment of the invention.
Figure 2B:
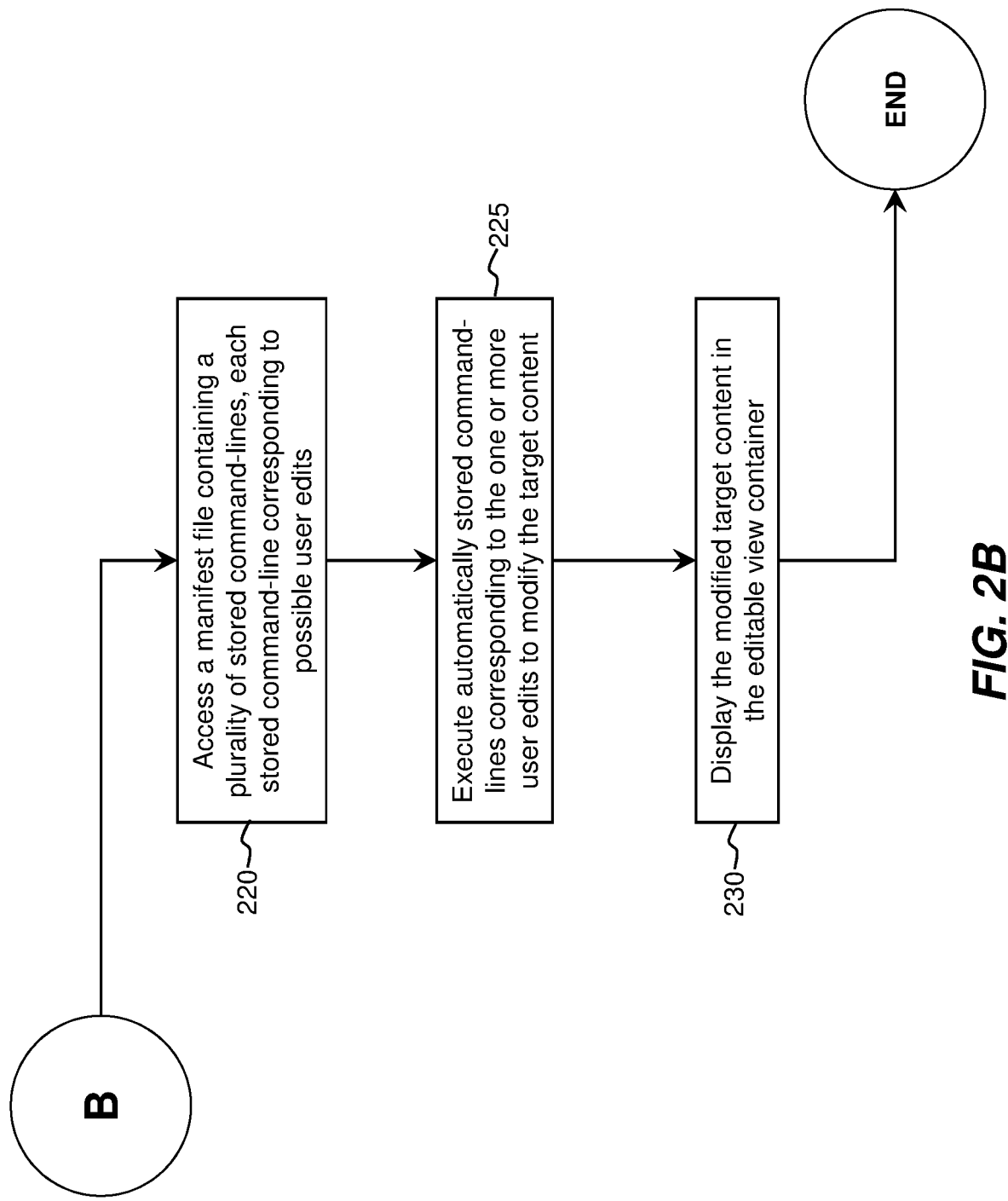

FIGS. 2A and 2B are a flowchart depicting operational steps that a hardware component, multiple hardware components, and/or a hardware appliance may execute, in accordance with an embodiment of the invention. At step 202, a command-line interface is presented to a user at user computer 110, for entry of a command-line. At step 205, a command-line is received in the command-line interface 114 to execute an editable view container 130, the editable view container 130 displaying target content 122 via the target content editor 132. At step 210, one or more user edits to modify the target content entered by the user into the editable view container are received. At step 215, the one or more user edits to modify the target content are validated by validation module 150, and the results of validation sent to user computer 110. At step 220, a manifest file 140 containing a plurality of stored command-lines is accessed, each stored command-line corresponding to possible user edits. At step 225, the stored command-lines corresponding to the one or more user edits to modify the target content are executed automatically. At step 230, the modified target content is displayed in the editable viewer 116, after being made available from the editable viewer 116.

Figure 3:
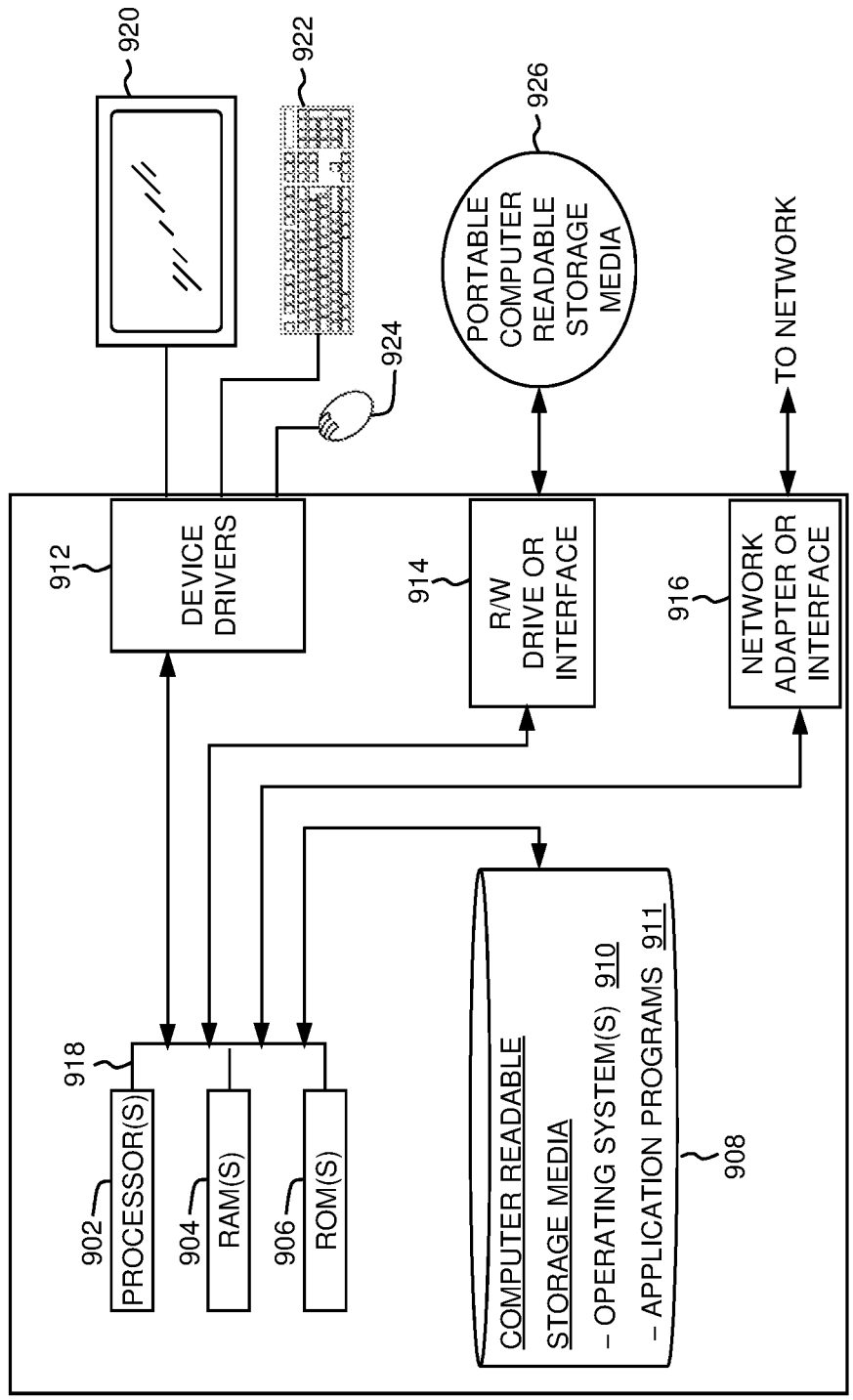
FIG. 3 depicts a block diagram of components of user computer, target system, editable view container, manifest file, validation component, interpretation component, and execution component of FIG. 1, in accordance with an embodiment of the present invention.

FIG. 3 depicts a block diagram of components of user computer 110, target system 120, editable view container 130, manifest file 140, validation component 150, interpretation component 160, and execution component 170 of the environment 100 for efficiently executing command-line interface commands with an automated command-line interface of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

User computer 110, target system 120, editable view container 130, manifest file 140, validation component 150, interpretation component 160, and execution component 170 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for efficiently executing command-line interface commands with an automated command-line interface, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computer 110, target system 120, editable view container 130, manifest file 140, validation component 150, interpretation component 160, and execution component 170 may also include a R/W drive or interface 914 to read from and write to one or more portable computer readable storage media 926. Application programs 911 may be stored on one or more of the portable computer readable storage media 926, read via the respective R/W drive or interface 914 and loaded into the respective computer readable storage media 908.

User computer 110, target system 120, editable view container 130, manifest file 140, validation component 150, interpretation component 160, and execution component 170 may also include a network adapter or interface 916, such as a TCP/IP adapter card or wireless communication adapter (such as a 4G wireless communication adapter using OFDMA technology). Application programs 911 on user computer 110, target system 120, editable view container 130, manifest file 140, validation component 150, interpretation component 160, and execution component 170 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computer 110, target system 120, editable view container 130, manifest file 140, validation component 150, interpretation component 160, and execution component 170 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
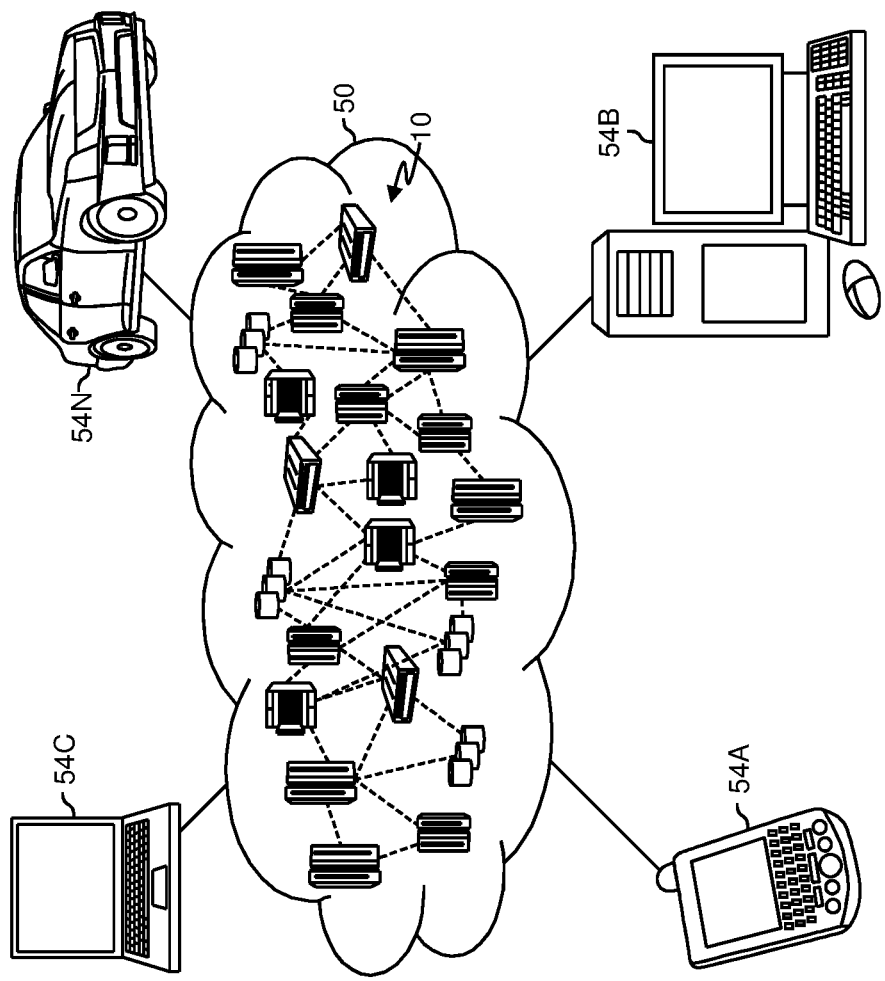
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
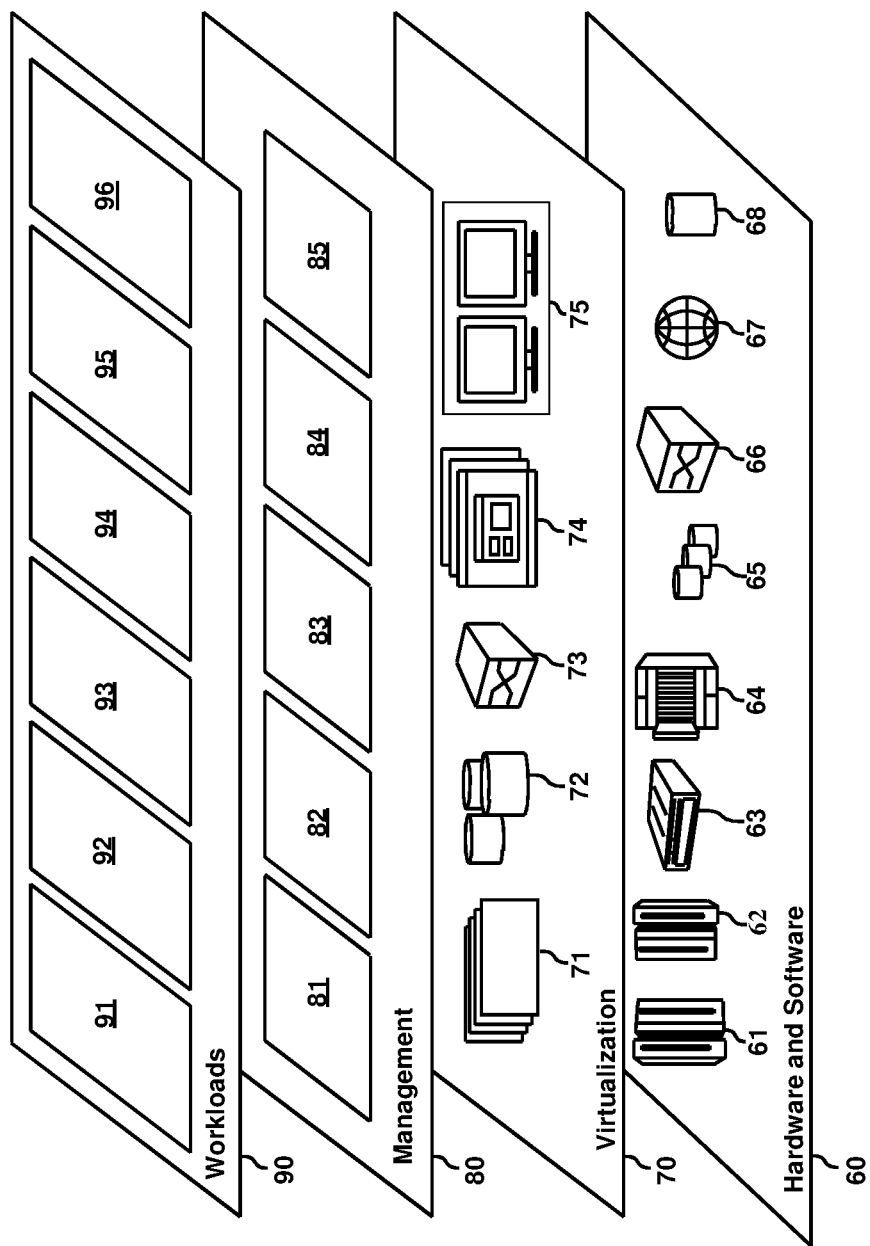
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an environment 96 for efficiently executing command-line interface commands with an automated command-line interface.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of efficiently executing command-line interface commands with an automated command-line interface, the method comprising:
   presenting by a computing device a command-line interface for entry of a command-line by a user;
   receiving by the computing device a command-line in the command-line interface to execute an editable view container, the editable view container displaying target content in an editable viewer, the editable view container existing side-by-side with the command-line interface;
   receiving by the computing device one or more user edits to modify the target content, wherein the one or more user edits are entered by the user into the editable viewer, wherein the one or more user edits are mapped with one or more command-line interface commands;
   receiving a save command from the user in the editable viewer or the command-line interface;
   validating the one or more user edits to the target content, wherein when validating the one or more user edits entered by the user into the editable viewer, the computing device determines the one or more user edits to the target content seek to modify protected target content or modify target content not meant to be changed;
   accessing by the computing device a manifest file containing a plurality of stored command-lines, each stored command-line corresponding to possible user edits;
   executing automatically by the computing device stored command-lines corresponding to the one or more user edits to modify the target content; and
   displaying the modified target content in the editable viewer.

2. The method of claim 1, wherein the target content displayed by the editable viewer is computer data, computer resources, or computer services.

3. The method of claim 2, wherein the target content is displayed as a list having columns and rows.

4. The method of claim 3, wherein the target content is not displayed in the command-line interface when displayed in the editable viewer.

5. The method of claim 1, wherein the one or more user edits to the target content are entered by the user performing at least one hotkey combination or clicking-and-dragging with a pointing device.

6. A computer program product using a computing device to execute command-line interface commands with an automated command-line interface, the computer program product comprising:
   one or more non-transitory computer-readable storage media and program instructions stored on the one or more non-transitory computer-readable storage media, the program instructions, when executed by the computing device, cause the computing device to perform a method comprising:
   presenting by a computing device a command-line interface for entry of a command-line by a user;
   receiving by the computing device a command-line in the command-line interface to execute an editable view container, the editable view container displaying target content in an editable viewer, the editable view container existing side-by-side with the command-line interface;
   receiving by the computing device one or more user edits to modify the target content, wherein the one or more user edits are entered by the user into the editable viewer, wherein the one or more user edits are mapped with one or more command-line interface commands;
   receiving a save command from the user in the editable viewer or the command-line interface;
   validating the one or more user edits to the target content, wherein when validating the one or more user edits entered by the user into the editable viewer, the computing device determines the one or more user edits to the target content seek to modify protected target content or modify target content not meant to be changed;
   accessing by the computing device a manifest file containing a plurality of stored
command-lines, each stored command-line corresponding to possible user edits;
   executing automatically by the computing device stored command-lines corresponding to the one or more user edits to modify the target content; and
   displaying the modified target content in the editable viewer.

7. The computer program product of claim 6, wherein the target content displayed by the editable viewer is computer data, computer resources, or computer services.

8. The computer program product of claim 7, wherein the target content is displayed as a list having columns or rows.

9. The computer program product of claim 8, wherein the target content is not displayed in the command-line interface when displayed in the editable viewer.

10. The computer program product of claim 6, wherein the one or more user edits to the target content are entered by the user performing at least one hotkey combination or clicking-and-dragging with a pointing device.

11. A computer system to execute command-line interface commands with an automated command-line interface, the computer system comprising:
one or more computer processors;
one or more computer-readable storage media;
program instructions stored on the computer-readable storage media for execution by at least one of the one or more processors, the program instructions comprising:
program instructions to present a command-line interface for entry of a command line by a user;
program instructions to receive a command-line in the command-line interface to
execute an editable view container, the editable view container displaying target content in an editable viewer, the editable view container existing side-by-side with the command-line interface;
program instructions to receive one or more user edits to modify the target content, wherein the one or more user edits are entered by the user into the editable viewer, wherein the one or more user edits are mapped with one or more command-line interface commands;
program instructions to receive a save command from the user in the editable viewer or the command-line interface;
program instructions to validate the one or more user edits to the target content, wherein when validating the one or more user edits entered by the user into the editable viewer, the computing device determines the one or more user edits to the target content seek to modify protected target content or modify target content not meant to be changed;
program instructions to access a manifest file containing a plurality of stored command-lines, each stored command-line corresponding to possible user edits;
program instructions to execute automatically the stored command-lines corresponding to the one or more user edits to modify the target content; and
program instructions to display the modified target content in the editable viewer.

12. The computer system of claim 11, wherein the target content displayed by the editable viewer is computer data, computer resources, or computer services.

13. The computer program product of claim 12, wherein the target content is displayed as a list having columns and rows.

14. The computer program product of claim 13, wherein the target content is not displayed in the command-line interface when displayed in the editable viewer.

15. The computer program product of claim 11, wherein the one or more user edits to the target content are entered by the user performing at least one hotkey combination or clicking-and-dragging with a pointing device.

* * * * *